Patented Dec. 21, 1937

2,103,075

UNITED STATES PATENT OFFICE 2,103,075

THERAPEUTIC PREPARATION AND METHOD OF MAKING IT

Edward A. Greenspon, Montreal, Quebec, Canada

No Drawing. Application November 23, 1936, Serial No. 112,425. In Canada May 26, 1934

14 Claims. (Cl. 167—74)

This invention relates to therapeutic preparations and methods of making; and it comprises as a therapeutic preparation a concentrated material corresponding to animal mucosa but free of active pepsin and of extraneous tissue; and it comprises a method of making such a material wherein mucosa is freed of active pepsin without opportunity to undergo autolysis; all as more fully hereinafter set forth and as claimed.

It is the current belief that in cases of pernicious anemia a causative factor is the inability of the stomach to secrete a definite "anti-pernicious anemia factor"; a hematopoietic factor. This active principle, anti-pernicious anemia factor, has been shown to stimulate the production of red blood cells. It has been shown to be present in the gastric juice of normal individuals and in the gastric juice and gastric mucosa of normal animals. On the other hand, the gastric juice of patients with pernicious anemia, so far as known, does not contain this active principle.

Much clinical work has been done with the anti-pernicious anemia factor of the stomach, with results which are not wholly satisfactory. Gastric juice and gastric mucosa alone administered to patients proved ineffective. Mixtures of either the juice or the mucosa with minced beef work better, although the action of such mixtures is irregular and they cannot well be standardized. They are, moreover, unduly bulky. Hog stomachs dried as a whole, that is muscular tissue and all, when defatted, dried and fine ground, give results which, on the whole, are better than those of other preparations.

All the known effective oral preparations are, however, bulky; the dosage required to produce a "characteristic reaction" is large. Often a dose of 40 grams or more of dried and fine ground whole stomach is required. This is too much for convenient administration in capsules; and all these preparations have an unpleasant taste and odor which militates against administration with foods and beverages. One preparation differs from another and it is current practice to test each batch with pernicious anemia patients to determine its potency; a time consuming operation. Prepartions of stomach for hypodermic use have not hitherto been considered practicable.

The whole stomach of any animal may be considered as consisting of two main layers: the mucosa, or lining, and the muscularis, or muscular tissue. The muscularis contains little or none of the principle useful in combatting pernicious anemia. The mucosa contains it and it also contains pepsinogen (pepsin) with localized concentrations of one or the other; areas in which their ratio varies. Yet, as stated, clinical experience has shown that administration of mucosa alone, that is, in the absence of muscularis, has little effect in cases of pernicious anemia. In one instance recorded in the literature, four administrations of mucosa alone gave negative results in three cases and but a weak positive result in the fourth. In all other recorded work, administration of mucosa sometimes gave positive and sometimes negative results. On the other hand, administration of mucosa together with the accompanying muscular tissue ordinarily gives positive results and other muscular tissue (minced beef) may be substituted.

As I have found, these discrepant results are due to the antagonistic action of pepsin on the active principle in the absence of large excesses of proteid matter; the excess supplied by the muscularis, or the minced beef, as the case may be.

It is an object achieved in the present invention to convert mucosa into various stable preparations efficient in the treatment of the various types of anemia, including pernicious anemia and tropical and other macrocytic anemias; the preparations also being useful in the treatment of pellagra, sprue and similar disorders. The preparations are particularly useful in the treatment of pernicious anemia. The preparations are of concentrated nature, as contrasted with the whole stomach, and include the anti-pernicious anemia active principle of gastric mucosa unaccompaned by active pepsin, pepsinogen or peptones in such quantities as substantially affect it. They are also unaccompanied by substantial amounts of extraneous muscular tissue or other protein matter. An object also achieved in the present invention is the manufacture of highly active preparations of standardized character effective in smaller and more convenient dosages and capable of use in making liquid preparations adapted for parenteral or hypodermic injection. Clinical tests show a potency many times greater than that of whole dried stomach.

As stated, the mucosa contains pepsinogen from which pepsin is produced in the normal activities of the stomach. The gastric mucosa is the seat of production of pepsinogen and pepsin, as well as of the anti-anemic substance. Pepsin is antagonistic to or destruction of the hematopoietic substance and attack of the pepsin on the active substance begins immediately upon the death of the animal tissue; pepsin being immediately formed from pepsinogen. Unless the tissues are kept extremely cold, there is a rapid destruction of the hematopoietic substance and this destruction continues while the tissues are moist in making dry preparations. This is one of the main reasons for the irregularity, or the non-standardized qualities, of commercial dried whole stomachs.

In the present invention, as a first step, the pepsin or pepsinogen is removed or rendered inactive, under conditions allowing little or no attack on the active anti-anemic principle. In what I now regard as the best embodiments of my invention, pepsin is extracted from the mucosa by the action of a cold, aqueous solvent at a temperature at which the pepsin has little proteolytic activity; around 0° C. An excellent solvent for this purpose is weak hydrochloric acid. Pepsinogen is converted into pepsin and goes into solution. The pepsin-containing solution thus formed can be treated to precipitate the pepsin which is filtered off. The filtrate can then be concentrated and reunited with the extracted mucosa, the whole being then dried. Under the conditions stated, the pepsin has no opportunity to effect any proteolytic action or substantial attack on the active principle.

From this solution, pepsin can be removed, leaving other extractive matters in solution. Various adsorbent bodies, including alumina and various clay preparations, can be used for removing the pepsin, but in what I regard as the best way, pepsin is thrown out of solution by an addition of acetone, with vigorous stirring. It is a useful expedient to add a little acetone preliminarily, throwing out certain extractive matters, and then add sufficient acetone to the filtered liquid to precipitate the pepsin itself. This pepsin which leaves the system, so far as the present invention is concerned, is a salable by-product and it can be recovered in nearly pure, ash free condition. Prior to precipitating the pepsin, the pH is adjusted to the iso-electric point.

After filtering out the pepsin, the acetone solution is concentrated and reunited with the extracted mucosa. The mixture is then dried and forms a preparation coming under the present invention. Concentration of the acetone solution may be effected before or after reunion with the extracted solids; but it is commonly best to evaporate the acetone solution in vacuum at the lowest possible temperature to obtain a syrup which is then remixed with the extracted solids and the whole dried on trays in a current of air.

The following is a more detailed exemplificatory embodiment of my invention.

The stomachs are removed from freshly killed animals, preferably hogs though other animals may be used, and opened up along one of the curvatures thereof. This material is washed and brushed in a stream of quite cold or iced water to remove mucus and other extraneous matter. The material being rather slippery, ordinarily it is handled by two operators using cloths to prevent slipping. Next, the mucosa (lining of the stomach) is stripped off; one operator holding the stomach material while the other strips the lining. For the most part, the mucosa pulls away quite freely. The mucosa is iced as it is obtained, to maintain it at a low temperature. Usually this is done by packing the stripped linings with ice in a suitable vessel.

The mucosa so recovered is rapidly frozen to obtain a material capable of being stored. In so doing, the cold mucosa is removed from the ice, wiped dry if desired, and placed in a refrigerator under conditions such that it is quickly frozen. In the frozen state, the mucosa may be stored for reasonable periods and used as required. The material, after a few days' or weeks' storage, is substantially the same as the newly frozen mucosa. However, it is best to use the material in a fresh condition, long storage not being desirable, as the anti-anemic agent may forfeit some of its activity if maintained too long in a frozen condition. Where fresh mucosa may be used immediately, it is possible to avoid the freezing step. The important consideration is to maintain the mucosa sufficiently cold to avoid formation of pepsin and the exercise of its enzymic action; to avoid a deleterious effect of the pepsin upon the active anti-anemic principle prior to processing.

The cold hog gastric mucosa is finely minced. Into a suitable vessel there is introduced one kilogram of finely minced mucosa and about 400 cc. of 2 per cent hydrochloric acid, which is advantageously precooled to about 0° C., is added; the materials being thoroughly stirred to obtain a uniform mixture. Conveniently, the mixture may be allowed to stand over night and ordinarily, about 12 to 24 hours are required to give a satisfactory extraction. When extraction is sufficient, about 1250 cc. of acetone, cooled to about 0° C., is added and the mixture is stirred, usually for about half an hour. These operations are carried out in a cold room. The mixture is then strained and filtered, two materials being thus obtained:—(a) the extracted solids, substantially free from pepsin, and (b) the acetone filtrate containing pepsin in solution and also certain acetone extractives. The extracted solids (a) are stored at 0° C. for the time being.

The filtrate (b) is now adjusted to a pH of about 3.4 to 3.6 by the addition of dilute (usually decinormal) hydrochloric acid. However, this particular pH is not rigidly necessary, good results being obtained with a pH as low as 2.8. To this acid filtrate is added about 625 cc. of acetone, precooled to about 0° C., to produce an acetone concentration of about 75 per cent. This serves to precipitate the pepsin. The solution is maintained cold until substantially all of the pepsin is precipitated, the pepsin precipitate being then removed by settling or centrifuging and leaving the system at this point.

The acetone extract is now substantially free from pepsin. Substances in the solution, other than pepsin, insoluble in acetone can be preliminarily precipitated by the addition of a little acetone prior to the addition of enough acetone to throw out the pepsin. When this is done, the substances precipitated by the first acetone addition remain with the mucosa. The first acetone addition is made prior to separating the extract from the mucosa.

The extract from the pepsin precipitation contains anti-anemic agent derived from the mucosa. It contains but little proteolyzed product formed by the action of pepsin, proteoses, peptones, etc. It may be used directly to make various preparations useful in the treatment of pernicious anemia and similar disorders. For example, this liquid may be concentrated by distilling off acetone under reduced pressure to form a concentrate capable of being stored and subsequently converted into other types of preparations useful for the purposes referred to herein. The active principle contained in the liquid may be recovered by concentration to dryness to give a powder useful as an oral preparation capable of being packaged and stored. Or, the active principle may be transferred to another type of solvent suitable for hypodermic injection. In making such liquid preparations, the acetone solution can be used to extract more anti-anemic substance by returning it to the mucosa for an additional period of extraction. In so doing, the concentration of acetone may be changed or a different solvent added or substituted.

A useful preparation may also be obtained by using the extracted mucosa alone, obtained as hereinbefore described, and subjecting it to desiccation at a temperature of between 30° and 45° C.

However, while as stated, the acetone solution alone or the extracted mucosa alone, may be used in these ways to give a product useful as such, I regard it as good practice to re-unite the concentrate from the acetone filtrate (b) with the original extracted solids of the mucosa (a), and dry the two together. A preparation so obtained represents a concentrate of the whole mucosa, save for the pepsin which has been removed and, usually save for some or most of the grease.

In drying, it is best to use a low temperature and vacuum is advantageous. I regard temperatures as best when not over say, 45° C., but a fairly wide range of temperature is permissible with material substantially free from pepsin, provided the temperature is below 60° C., the point at which anti-anemic agent begins to be destroyed. In practice, generally the syrupy concentrate made from the acetone extract (b) is thoroughly mixed with the extracted solids of the mucosa (a), and a semi-solid mush is obtained which can be readily dried in trays or in a current of air. A well dried material may be packaged and stored over reasonable periods of time.

The dry material, with or without defatting, may be pulverized to a fine powder. This powder may be converted to tablets with the usual tableting machines. These tablets may be protected against moisture and retained in a suitable condition by applying a suitable coating to them. Likewise, the dry powder may be protected by introducing it into capsules or other suitable containers. These capsules and tablets may be administered orally and contain fully effective dosages of the anti-anemic agent in a very much less bulky and more palatable form than the anti-anemic stomach preparations heretofore known. In other words, the new concentrated preparation is, gram for gram, much more active as regards anti-anemic properties.

The action of pepsin on proteins is to form albumoses, proteoses and peptones. In the present invention, the product is nearly free from these proteolyzed materials, the action of the liquid solvent in forming and extracting pepsin being at such low temperature and under such other conditions that the pepsin has but little enzymic activity.

In the described operations, the removal of pepsin is tolerably complete. However, some residual pepsin in the material does no great harm and may be rendered innocuous by maintaining neutrality or by employing lower temperatures during the concentration and drying processes. The activity of pepsin is mainly in warm acid solutions and is not great in solutions strong in acetone. Its activity is practically nil at temperatures around 0° C., while in dry preparations pepsin has no activity.

While I regard mucosa stripped from hog stomachs as the best starting material, preparations of high efficiency can be obtained in similar ways from gastric juices, pressed stomachs, etc. Mostly, the liquid is kept as cold as possible, fractionally precipitated with acetone and then the pepsin precipitated, after an adjustment of pH, by addition of enough acetone to give a 75 per per cent solution.

In lieu of the 2 per cent hydrochloric acid stated, other strengths may be used and other acids, such as acetic acid, of equivalent strength, may be substituted. However, a 2 per cent hydrochloric acid solution is satisfactory.

Less advantageous methods of operation may be used, as in extracting the pepsinogen as such by very cold glycerin. A still less advantageous preparation, because of greater bulk, may be made by inactivating the pepsinogen so that pepsin is not produced. The formation of pepsin may be slowed down to a considerable extent by reducing the natural acidity of the material, using buffered alkalies and the like. For example, mucosa may be treated with sodium phosphates to give a pH of 6 or higher and the cold muscosa dried at as low a temperature as is consistent with rapid desiccation.

According to the invention any suitable substances such as dilute hydrochloric acid, glycerine, alumina and various clay preparations which are non-injurious to the anti-anemic agent but are capable of removing the pepsin, pepsinogen or other substances deleterious or antagonistic to the anti-anemic agent may be used. Such substances are referred to in the appended claims as "pepsin extractant".

As stated, the active principle contained in the acetone solution may be transferred to other liquids. One way of doing this is to precipitate the syrup with absolute alcohol. Usually, enough absolute alcohol is used to make a 95 per cent alcohol with the water of the syrup. This addition of alcohol results in the precipitation of proteid matter. This is separated and goes out of the system. The alcoholic liquid containing the active principle may be reconcentrated to a minimum volume, thereby boiling off the alcohol and any acetone which may be present, and then the syrupy residue sterilized by passing through a close-pored filter of the Berkfeld type. This gives a highly concentrated preparation in liquid form which can be stored in sterilized ampoules and administered hypodermically, for example as an intramuscular injection.

Dry preparations under the present invention may be used and dispensed in the usual ways and may also be admixed with various other therapeutic agents in well understood ways. An addition of iron compounds is often useful in combating various anemias.

All preparations containing mucosa tissue are apt to have an unpleasant taste and while this is not particularly objectionable in a preparation to be administered in capsules, nevertheless it is usually better to defat the material in some stage of the operation. Defatted preparations do not turn rancid. In defatting, any of the usual fat solvents may be employed, such as the chlorinated hydrocarbons, notably trichlorethylene, light petroleum hydrocarbons, light coal tar oils, such as benzene, etc. In this type of grease solvent, the active principle is but little soluble.

Using the whole mucosa of the stomachs of many animals, it is easier to make standardized preparations, local and individual differences being averaged out.

Total removal of pepsin, actual or potential, is not required. The mucosa contains some proteid matter, inactivating pepsin up to a certain amount; masking it, so to speak. And in any event, production of pepsin from residual pepsinogen is slow in non-acid and cold moist material. For the present purposes, the pepsin content should be lowered as far as possible, but with a preparation showing an original pepsin value of, say, 1400 units, if the pepsin is lowered to 200 units or less, the residue may be considered negligible.

This application is a continuation in part of application Serial No. 23,287 filed May 24, 1935.

What I claim is:—

1. In the manufacture of therapeutic preparations, useful in the treatment of pernicious anemia, the steps which comprise treating gastric mucosa containing an active hematopoietic agent with dilute hydrochloric acid solution, maintaining the mixture at about 0° C. until substantial extraction has been effected, adding approximately 50 per cent of acetone to the mixture, straining and filtering the mixture to separate the liquid extract from the extracted mucosa, adjusting the separated extract to an isoelectric pH, adding additional acetone to precipitate the pepsin, removing the precipitate and thereafter concentrating the liquid extract.

2. In the process of claim 1, reuniting the final liquid extract with the extracted mucosa and drying the mixture.

3. In the manufacture of therapeutic preparations from fresh animal mucosa, the process which comprises chilling the mucosa to about 0° C., extracting with cold weak acid to form pepsin from pepsinogen and thereafter removing the pepsin, precipitating pepsin from the solution with acetone, removing the precipitate, concentrating the liquid, reuniting the concentrated liquid with the extracted mucosa and drying and desiccating the reunited material.

4. In the preparation of a material efficient against pernicious anemia, the process which comprises chilling fresh gastric mucosa, mincing, extracting with ice cold dilute acid until a substantial amount of pepsin goes into solution, adding acetone, straining and filtering to separate the solution and the solids, precipitating pepsin from the filtrate by a further addition of acetone, filtering off the pepsin precipitate and returning unprecipitated solids of the filtrate to the extracted mucosa.

5. A method for obtaining a concentrated anti-anemic preparation from gastric material and substantially free from pepsin and like substances deleterious to the anti-anemic substance, which comprises treating fresh gastric material containing said substance with a pepsin extractant non-injurious to said anti-anemic substance to remove substantially all of the pepsin and like deleterious substances contained in the gastric material, separating off from the gastric material the said pepsin extractant with the pepsin and like deleterious substances associated therewith, and concentrating said treated gastric material.

6. A composition of matter useful as a therapeutic anti-anemic agent comprising a concentrate extracted from fresh animal gastric material containing the anti-anemic substance and substantially free from pepsin and like agents deleterious to the anti-anemic substance contained in said gastric material.

7. A composition of matter useful as a therapeutic anti-anemic agent comprising a liquid extract of fresh animal gastric mucosa containing an active anti-anemic substance substantially free from pepsin and like agents deleterious to the anti-anemic substance contained in said mucosa.

8. A composition of matter useful as a therapeutic agent for combating anemias comprising comminuted desiccated gastric mucosa obtained from freshly killed animals and containing the anti-anemic substance free from substantially all pepsin and like agents deleterious to said anti-anemic substance.

9. A composition of matter useful as a therapeutic agent for combating anemias comprising gastric materials containing the anti-anemic substance and having incorporated therein pepsin-inactivating and pepsinogen-inactivating agents having a pH above 6.

10. A composition of matter useful as a therapeutic anti-anemic agent comprising a defatted concentrate extracted from fresh animal gastric material containing the anti-anemic substance and substantially free from pepsin and like agents deleterious to the anti-anemic substance contained in said gastric material.

11. A method for obtaining a concentrated liquid extract from fresh gastric mucosa and like gastric material and substantially free from pepsin and like substances deleterious to the anti-anemic substance, which comprises treating fresh gastric material containing said substance with a pepsin extractant non-injurious to said anti-anemic substance to remove substantially all of the pepsin and like deleterious substances contained in the gastric material, separating off from the said gastric material the pepsin extractant with the pepsin and like deleterious substances associated therewith, adding absolute ethyl alcohol to the residual gastric material to precipitate further impurities, filtering off these impurities, concentrating the filtrate and sterilizing the concentrated extract so obtained.

12. A method for obtaining a dry concentrated anti-anemic preparation from fresh gastric mucosa and substantially free from pepsin, which comprises treating fresh gastric mucosa with dilute cold hydrochloric acid to extract pepsin, maintaining a temperature of approximately 0° C. until a substantial extraction and subsequent removal of the pepsin has been effected, adding acetone to approximately 50 per cent concentration to further extract and inactivate the pepsin, separating off the solid gastric material from the acetone extract so prepared, adjusting said separated acetone extract to an isoelectric pH, adding to said extract additional acetone to make a concentration of about 75 per cent of same in order to precipitate the dissolved pepsin, separating off the precipitated pepsin, concentrating said acetone extract, recombining this liquid extract with the said solid materials, and drying and desiccating the mixture.

13. A method for obtaining a dry concentrated anti-anemic preparation from fresh gastric mucosa and substantially free from pepsin, which comprises treating fresh gastric mucosa with dilute cold hydrochloric acid to extract pepsin, maintaining a temperature of approximately 0° C. until a substantial extraction of pepsin has been effected, separating off the pepsin solution from the solid gastric material, drying and desiccating the said solid material.

14. A method for obtaining a concentrated anti-anemic preparation from fresh gastric material containing anti-anemic substance which comprises treating said gastric material with pepsin-inactivating and pepsinogen-inactivating agents, concentrating said treated material, and maintaining low temperatures throughout the making of said preparation to prevent activation of pepsin present.

EDWARD A. GREENSPON.